(12) United States Patent
Watanabe et al.

(10) Patent No.: US 7,080,571 B2
(45) Date of Patent: Jul. 25, 2006

(54) BALL SCREW

(75) Inventors: Yasumi Watanabe, Kanagawa (JP); Shigeru Okita, Kanagawa (JP); Masato Kato, Gunma (JP)

(73) Assignee: NSK Ltd., Tokyo (JP)

( * ) Notice: Subject to any disclaimer, the term of this patent is extended or adjusted under 35 U.S.C. 154(b) by 244 days.

(21) Appl. No.: 10/396,436

(22) Filed: Mar. 26, 2003

(65) Prior Publication Data
US 2003/0196504 A1    Oct. 23, 2003

(30) Foreign Application Priority Data
Mar. 26, 2002  (JP)  .......................... P. 2002-086527
Dec. 25, 2002  (JP)  .......................... P. 2002-374822

(51) Int. Cl.
*F16C 25/22*    (2006.01)

(52) U.S. Cl. ................................. 74/424.86; 74/424.82

(58) Field of Classification Search ............. 74/424.86, 74/424.87, 424.82
See application file for complete search history.

(56) References Cited

U.S. PATENT DOCUMENTS

| | | | | |
|---|---|---|---|---|
| 477,642 A | * | 6/1892 | Brunthaver | .............. 74/424.75 |
| 3,580,098 A | * | 5/1971 | Goad | ...................... 74/424.87 |
| 6,112,610 A | * | 9/2000 | Welling | .................... 74/424.86 |
| 6,192,585 B1 | * | 2/2001 | Buchanan et al. | ........ 29/898.06 |
| 6,286,383 B1 | * | 9/2001 | Shirai et al. | ............. 74/424.88 |
| 6,397,697 B1 | * | 6/2002 | Ninomiya et al. | ........ 74/424.83 |
| 6,561,054 B1 | * | 5/2003 | Chiu et al. | ................ 74/424.88 |
| 6,581,489 B1 | * | 6/2003 | Ohkubo | ................... 74/424.86 |
| 2002/0023513 A1 | * | 2/2002 | Sekiya et al. | ............ 74/424.87 |

FOREIGN PATENT DOCUMENTS

| | | |
|---|---|---|
| DE | 42 35 842 C2 | 8/1999 |
| DE | 100 42 610 A1 | 6/2001 |
| DE | 101 10 220 A1 | 9/2001 |
| JP | 2001-141019 | 5/2001 |

* cited by examiner

*Primary Examiner*—William C. Joyce
(74) *Attorney, Agent, or Firm*—Sughrue Mion, PLLC

(57) ABSTRACT

A ball screw has a screw shaft including a spiral-shaped ball rolling groove formed in an outer peripheral surface thereof; a nut including a spiral-shaped ball rolling groove formed in an inner peripheral surface thereof; a plurality of balls disposed in a raceway formed by the two rolling grooves; and, a return path for moving the balls from the terminal point of the raceway to the start point of the raceway, the two end portions of the return path respectively including a rising surface rising from the ball rolling groove of the nut and a stopper portion disposed opposed to the rising surface to form the end portion of the raceway, wherein a boundary portion between the rising surface and the ball rolling groove of the nut is formed a round portion having the radius of curvature 0.05 times the diameter of the ball or more.

6 Claims, 6 Drawing Sheets

BALL SCREW

BACKGROUND OF THE INVENTION

1. Field of the Invention

The present invention relates to a ball screw which is characterized by a boundary portion between a raceway and a return path.

2. Description of the Related Art

An example of a conventional ball screw is shown in FIG. 6 (which is a perspective view thereof) and FIG. 7 (a section view thereof) This is a ball screw of a tube type which uses a tube as a return path for balls; and the present ball screw is composed of a screw shaft 1, balls 3 and tubes 4. In FIG. 6, reference character 5 designates a tube holder for fixing the tubes 4 to a nut 2 and, in FIG. 7, illustration of this tube holder 5 is omitted.

In the outer peripheral surface of the screw shaft 1 and the inner peripheral surface of the nut 2, there are respectively formed spiral-shaped grooves 11, 21, while these spiral-shaped grooves 11, 21 cooperate together in forming a raceway for the balls 3. And, in case where the balls 3 roll on this raceway while they are loaded, the nut 2 is moved linearly with respect to the screw shaft 1. That is, the spiral-shaped grooves 11, 21 of the screw shaft 1 and nut 2 cooperate together in forming a ball rolling groove.

The tube 4 is formed substantially in a gate shape, while the two end portions of the tube 4 are respectively inserted into their associated penetration holes 22 formed in a cylindrical body which is used as the nut 2 and they are disposed diagonally opposite to each other across the screw shaft 1 so as to be able to connect together the start and end points of the raceway. This example has two ball circulation passages (a raceway+a return path) and, therefore, there are disposed two tubes 4.

FIG. 8 is a partial section view of the present ball screw, showing a boundary portion between the raceway and return path. In the nut 2, there is formed a penetration hole 22 facing from the outer peripheral surface thereof toward the ball rolling groove 21, while the end portion of the tube 4 is disposed in this penetration hole 22.

This penetration hole 22 has a stepped portion 22a for receiving the end face of the tube 4. That is, when the end portion of the tube 4 is mounted into the penetration hole 22, due to the stepped portion 22a of the penetration hole 22, the surface (the groove-side surface) 22b of the hole 22 formed on the ball rolling groove 21 side can be made to coincide with the inner surface 41 of the tube 4. The groove-side surface 22b corresponds to a rising surface where the end portion of the return path rises from the ball rolling groove 21 of the nut 2.

Also, in the end portion of the tube 4, there is formed a tongue 42 which, in a state where the tube 4 is mounted, is disposed opposed to the groove-side surface 22b of the penetration hole 22. This tongue 42 extends up to the vicinity of the bottom surface of the ball rolling groove 11 of the screw shaft 1 and provides a stop portion serving as the end portion of a raceway 30 which is composed of the ball rolling grooves 11, 21.

Therefore, a ball 3, which has arrived at the vicinity of the end point of the raceway 30, is butted against the leading end of the tongue 42 and is scooped up, is moved through between the groove-side surface 22b of the penetration hole 22 and tongue 42, and is guided into the tube 4. Also, the ball 3, which has moved through the tube 4, is then moved between the groove-side surface 22b of the penetration hole 22 and is guided into the raceway 30.

In the above-mentioned conventional ball screw of a tube type, there is a problem that the boundary portion between the rising surface of the return path (the groove-side surface 22b of the penetration hole 22) and the ball rolling groove 21 of the nut 2 hinders the smooth movement of the ball 3. To solve this problem, in JP-A-2001-14101, there is proposed a technique in which an angular boundary portion 25 is worked or shaven to turn it into a smooth shape (for example, such a surface shape as shown by reference character 27 in FIG. 8).

However, in the technique disclosed in the above-cited publication of patent application, there is room for improvement in the durability of the ball screw especially when it is rotated at a high speed.

SUMMARY OF THE INVENTION

Accordingly, it is an object of the present invention to provide a ball screw which is excellent in durability when it is rotated at a high speed.

In attaining the above object, according to the present invention, there is provided a ball screw having a screw shaft including a spiral-shaped ball rolling groove formed in an outer peripheral surface thereof; a nut including a spiral-shaped ball rolling groove formed in an inner peripheral surface thereof; a plurality of balls disposed in a raceway formed by the two rolling grooves; and, a return path for moving the balls from the terminal point of the raceway to the start point of the raceway, the two end portions of the return path respectively including a rising surface rising from the ball rolling groove of the nut and a stopper portion disposed opposed to the rising surface to form the end portion of the raceway, wherein a boundary portion between the rising surface and the ball rolling groove of the nut is formed a round portion having the radius of curvature 0.05 times the diameter of the ball or more. By the way, the round portion can be formed according to an abrasive flow machining method.

In the above construction, it is preferable that the return path is partially formed by a tube including the stopper portion, and the rising surface is formed on the inner peripheral surface of the nut so as to form the return path.

Here, the abrasive flow machining method is a surface removing (abrading) method using viscoelastic fluid mixed with abrasives such as silicon carbide or diamonds, in which the viscoelastic fluid is made to flow in the working portions of a work to move the abrasives of the viscoelastic fluid in pressure contact therewith, thereby removing the surfaces of the working portions of the work.

According to the ball screw of the present invention, since, in the boundary portion, there is formed a round portion having the radius of curvature 0.05 times the diameter of the ball or more, stresses to be generated in the nut when the ball collides with the boundary portion can be reduced over a ball screw in which the radius of curvature of a round portion is 0.05 times the diameter of the ball or less. Also, there can be prevented generation of metal powder which can otherwise occur in the collision of the ball with the boundary portion due to the reduced collision load applied to the nut. Also, due to the reduced collision load applied to the nut, generation of metal powder caused by the collision can be prevented. This makes it possible to extend the life of the ball screw when it is rotated at a high speed.

In a ball screw according to the present invention, in case where a hold piece so shaped as to have two concave-shaped surfaces for receiving balls respectively formed in the two bottom surfaces of a substantially cylindrical-shaped body or a spherical-shaped body smaller in size than the ball is interposed between the mutually adjoining ones of the balls, collision or mutual rubbing between the balls can be reduced, which makes it possible to extend the lives of the balls and the lives of the ball rolling grooves further.

DETAILED DESCRIPTION OF THE PREFERRED EMBODIMENTS

Now, description will be given below of an embodiment of a ball screw according to the present invention.

Figure 1:
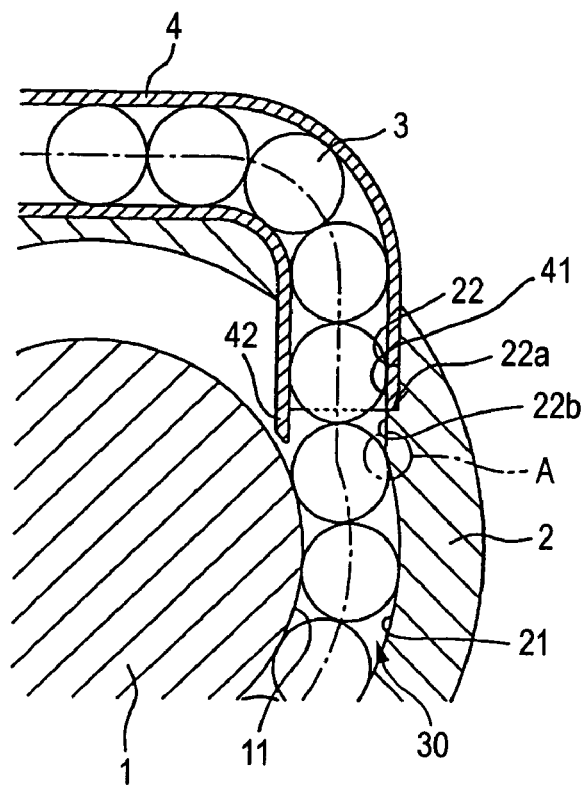
FIG. 1 is a section view of a boundary portion between a raceway and a return path formed in a ball screw corresponding to an embodiment of a screw according to the present invention.
Figure 2:
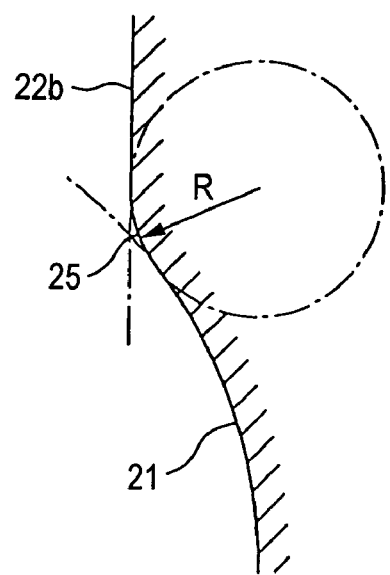
FIG. 2 is an enlarged view of the A portion shown in FIG. 1.
Figure 6:
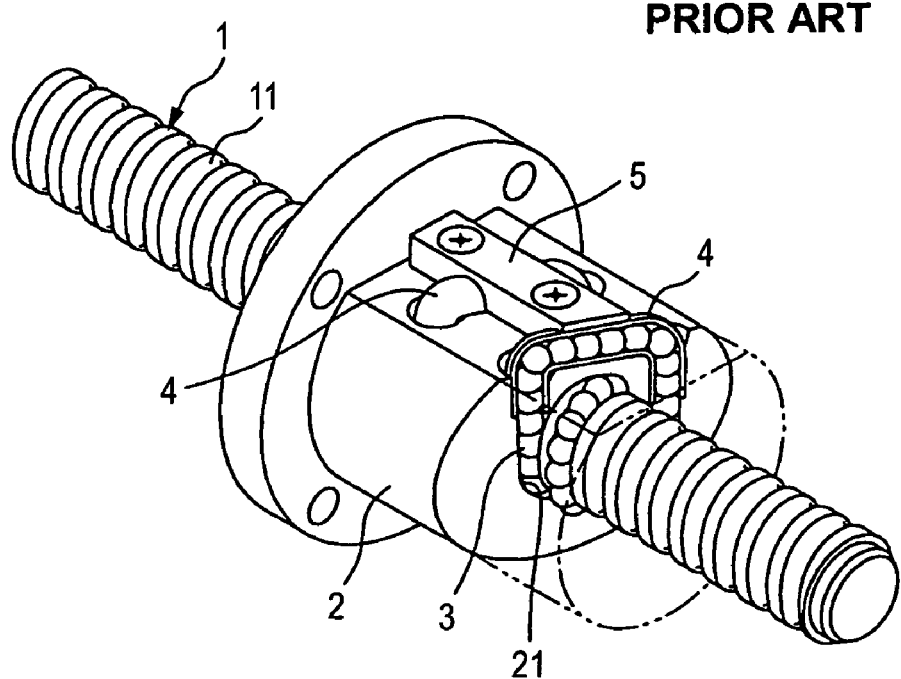
FIG. 6 is a perspective view of an example of a ball screw of a tube type.
Figure 7:
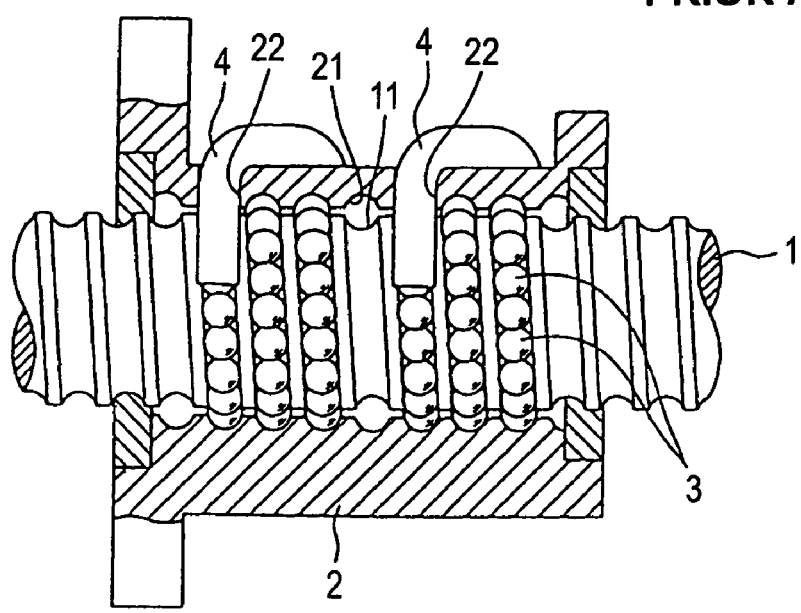
FIG. 7 is a section view of the example of a ball screw of a tube type, in which only the nut is shown in section.
Figure 8:
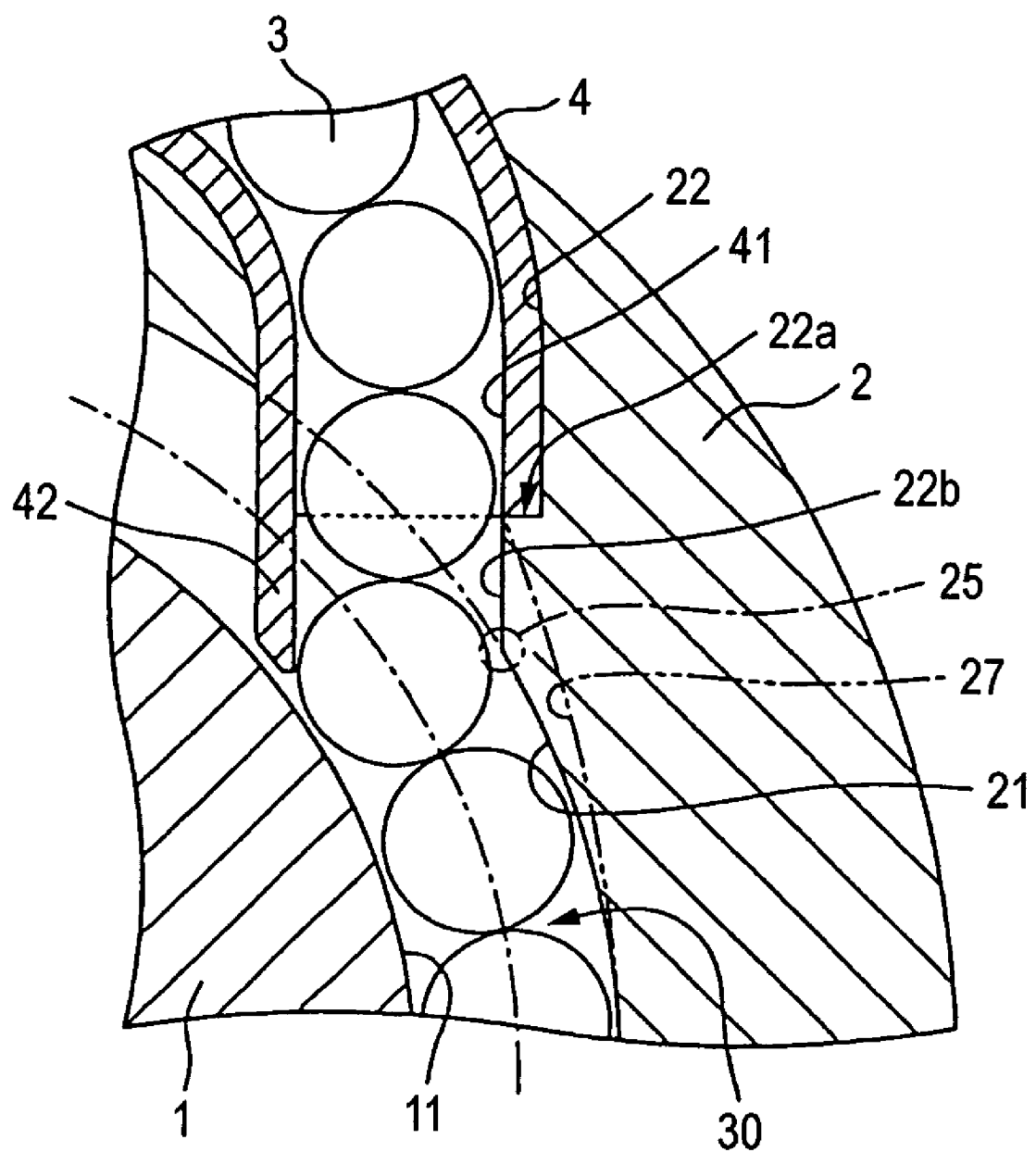
FIG. 8 is a section view of a boundary portion of a raceway and a return path formed a conventional ball screw.
Figure 9:
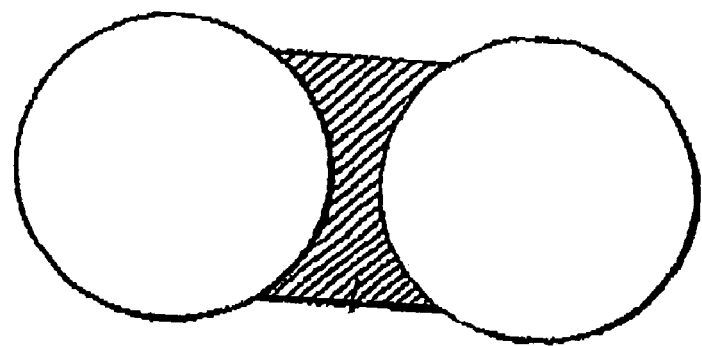
FIG. 9 is a partial cross-sectional view showing balls and a hold piece.
Figure 10:
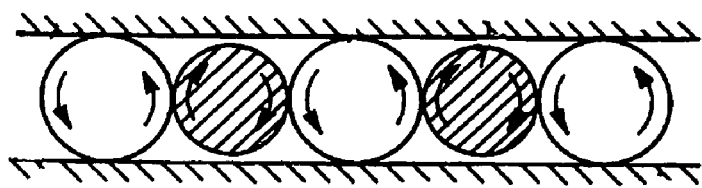
FIG. 10 is a partial cross-sectional view showing spherical-shaped bodies smaller in size than, and interposed between, balls.

FIG. 1 is a partial section view of a ball screw according to the present embodiment, showing a boundary portion between a raceway and a return path. FIG. 2 is an enlarged view of the A portion shown in FIG. 1. The other remaining portions of the ball screw according to the present embodiment than the boundary portion are the same as the conventional ball screw shown in FIGS. 6 and 7.

As shown in FIG. 1, in a nut 2, there is formed a penetration hole 22 extending from the outer peripheral surface of the nut 2 toward a ball rolling groove 21 and, the end portion of a tube 4 is disposed in the penetration hole 22. The penetration hole 22 has a stepped portion 22a which is used to receive the end face of the tube 4. Thanks to this structure, when the end portion of the tube 4 is mounted into the penetration hole 22, the stepped portion 22a of the penetration hole 22 allows the surface (groove-side surface) 22b of the hole 22 on the ball rolling groove 21 side to coincide with the inner surface 41 of the tube 4. The groove side surface 22a corresponds to a rising surface where the end portion of the return path rises from the ball rolling groove 21 of the nut 2.

Also, in the end portion of the tube 4, there is formed a tongue 42 which, in a state where the tube 4 is installed, is disposed opposed to the groove-side surface 22b of the penetration hole 22. This tongue 42 extends up to the vicinity of the bottom surface of the ball rolling groove 11 formed in the screw shaft 1 and serves as a stopper portion to stop the end portion of a raceway 30 which is composed of ball rolling grooves 11, 21.

And, as shown in FIG. 2, in the boundary portion 25 between the rising surface (the ball-rolling-groove-21-side surface of the penetration hole 22) 22b of the return path and the ball rolling groove 21 of the nut 2, there is formed a round portion having the radius of curvature R 0.05 times the diameter of the ball 3 or more.

Here, in case where the penetration hole 22 is formed in the nut 2 by cutting, the boundary portion 25 between the ball-rolling-groove-21-side surface (rising surface) 22b of the penetration hole 22 and the ball rolling groove 21 provides an angular shape; however, by removing the angular-shaped portion 25 according to an abrasive flow machining method, the above-mentioned round portion can be formed.

The inventors produced ball screws which were different only in the radius of curvature R of the round portion, and conducted a test to check the respective ball screws for their lives. That is, after the penetration hole 22 was formed in the nut 2 by cutting, the angular-shaped portion was worked by using an abrasive flow machining method; and, by changing the time of the abrasive flow machining, the grain sizes of abrasives to be used and pressures to be applied, there were formed the boundary portions 25 of the nuts 2 the round portions of which were different in the radius of curvature R from each other.

As a ball screw, there was used an NSK ball screw [BS2520] (the diameter Dw of the ball: 4.7625 mm, the diameter Dm of the ball pitch circle: 25.5 mm). As a tester, there was used an endurance life tester made for a ball screw by NSK. The test conditions were as follows. That is, pre-load: 500 N, test load: 1000N (axial load), rotation speed (n): 500–4000 rpm, stroke: 500 mm, lubricating grease: [Albania No. 2] made by Showa Shell Sekiyu K.K.

Figure 3:
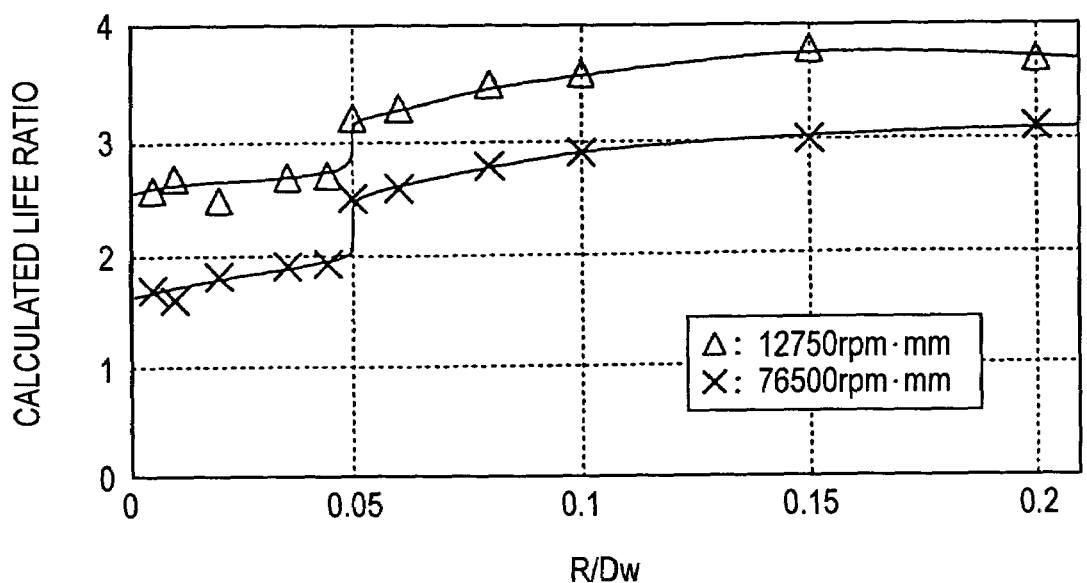
FIG. 3 is a graphical representation of the relationship between calculated life ratios obtained from test results and [R/Dw]

The respective ball screws were set on the tester, the travelling distance of each of the ball screws until a breakaway occurred in one of the ball and the ball rolling groove of the screw shaft or nut was measured, and ratios of the measured values to the calculated lives (the calculated life ratio) were calculated. FIG. 3 is a graphical representation to show the relationship between the calculated life ratios obtained in this test and [R/Dw], and FIG. 4 is a graphical representation to show the relationship between the calculated life ratios and [Dm×n] values, respectively.

Specifically, FIG. 3 shows graphically the results obtained when [Dm×n] is 12750 rpm×mm and when it is 76500 rpm×mm; and, in both of them, in case where [R/Dw] is 0.05 or more, the calculated life ratios increase greatly.

Figure 4:
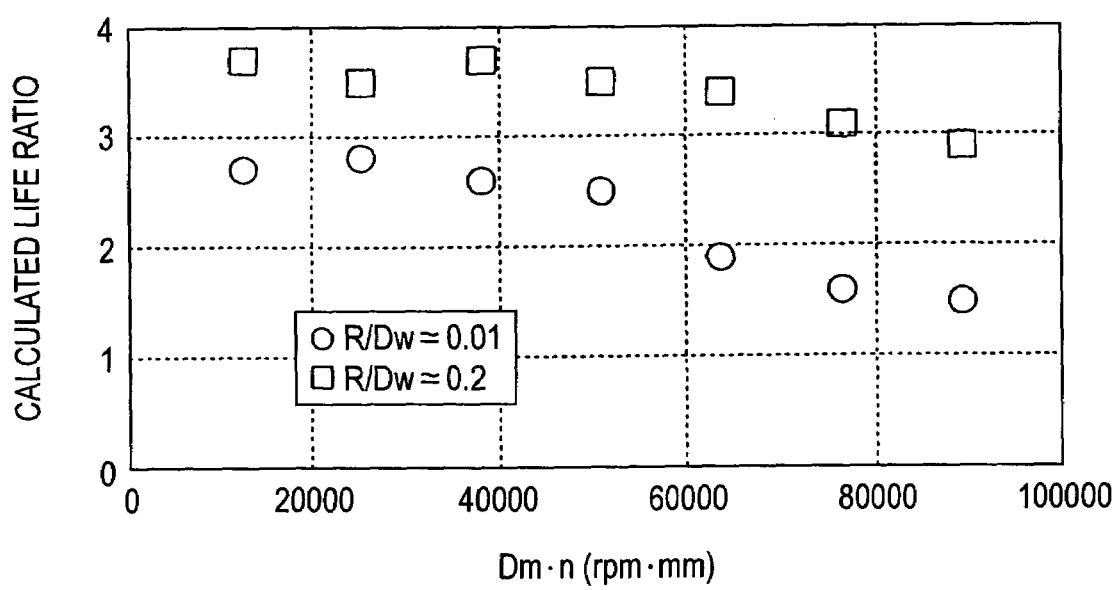
FIG. 4 is a graphical representation of the relationship between calculated life ratios obtained from test results and [Dm×n] values.

And, FIG. 4 shows the results obtained when [R/Dw] is 0.01 and when it is 0.2. As can be seen from FIG. 4, for [R/Dw] of 0.01, in case where [Dm×n] is 76500 rpm×mm or more, the calculated life ratios decrease greatly; however, for [R/Dw] of 0.2, even in case where [Dm×n] is 76500 rpm×mm or more, the calculated life ratios do not decrease so much.

As can be understood from the above results, by disposing a round portion having the radius of curvature R 0.05 times the diameter of the ball 3 or more in the boundary portion 25 between the rising surface (the groove-side surface of the penetration 22 of the penetration hole 22) 22b of the return path and the ball rolling groove 21 of the nut 2, there can be obtained a ball screw which is excellent in durability when the ball screw is rotated at a high speed where [Dm×n] is 76500 rpm×mm or more.

Figure 5A:
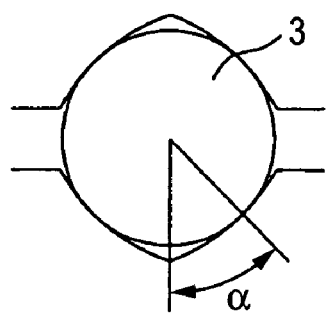
FIGS. 5A to 5C are explanatory views of a method for measuring the radius of curvature of a boundary portion between a rising surface and a ball rolling groove.
Figure 5B:
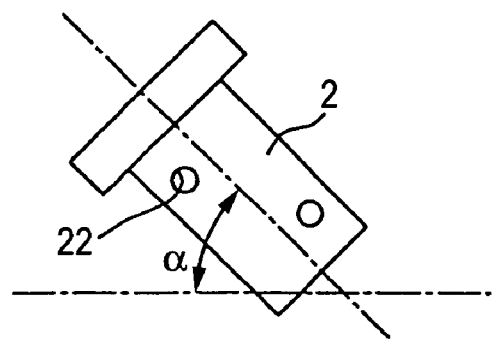
Figure 5C:
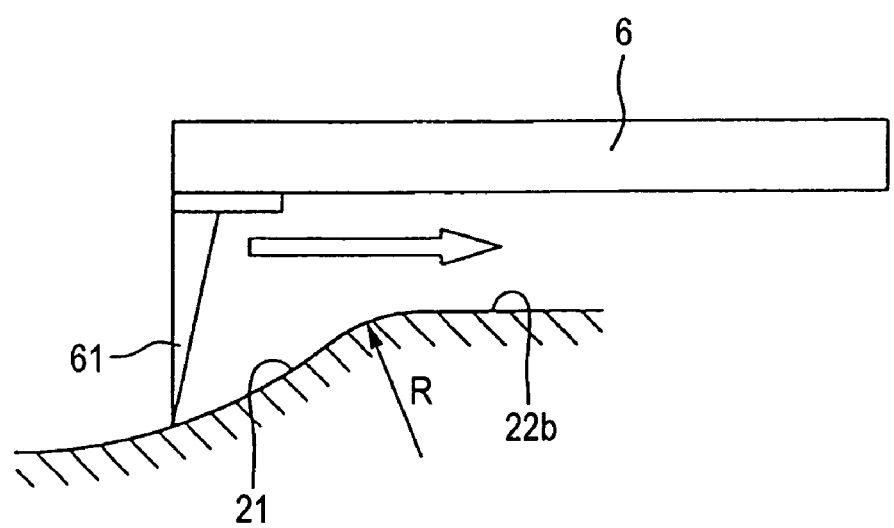

By the way, the radius of curvature R of the boundary portion 25 can be measured according to the following method. That is, firstly, as shown in FIGS. 5A and 5B), the nut 2 is fixed in such a manner that it is inclined from the horizontal surface by the contact angle α of the ball 3. Next, a probe 61 disposed in a contour shape measuring machine 6 is inserted into the penetration hole 22 of the nut 2 into which the end portion of the tube 4 is inserted and, as shown in FIG. 5C, the probe 61 is moved from the ball rolling groove 21 of the nut 2 toward the groove-side surface 22b of the penetration hole 22.

As has been described heretofore, according to the present invention, there can be obtained a ball screw which is excellent in durability when it is rotated a high speed.

What is claimed is:

1. A ball screw comprising:
a screw shalt including a spiral-shaped ball rolling groove formed in an outer peripheral surface thereof;
a nut including a spiral-shaped ball rolling groove formed in an inner peripheral surface thereof;
a plurality of balls disposed in a raceway formed by the two rolling grooves; and,
a return path for moving the balls from the terminal point of the raceway to the start point of the raceway, the two end portions of the return path respectively including a rising surface rising from the ball rolling groove of the nut and a stopper portion disposed opposed to the rising surface to form the end portion of the raceway,
wherein a boundaiy portion between the rising surface and the ball rolling groove of the nut is formed as a convex shaped portion towards the screw shaft having the radius of curvature 0.05 times the diameter of the ball or more,
wherein the return path is partially formed by a tube including the stopper portion, and the rising surface is formed on the inner peripheral surface of the nut so as to form the return path.

2. The ball screw according to claim 1, wherein the round portion is formed according to an abrasive flow machining method.

3. The ball screw according to claim 2, wherein a hold piece is interposed between the mutually adjoining ones of the balls, the hold piece having concave-shaped surfaces for receiving the balls in the two bottom surfaces of a substantially cylindrical body.

4. The ball screw according to claim 2, wherein a spherical-shaped body smaller in size than the ball is interposed between the mutually adjoining ones of the balls.

5. The ball screw according to claim 1, wherein a hold piece is interposed between the mutually adjoining ones of the balls, the hold piece having concave-shaped surfaces for receiving the balls in the two bottom surfaces of a substantially cylindrical body.

6. The ball screw according to claim 1, wherein a spherical-shaped body smaller in size than the ball is interposed between the mutually adjoining ones of the balls.

* * * * *